United States Patent
Sautron et al.

(10) Patent No.: US 10,473,805 B2
(45) Date of Patent: Nov. 12, 2019

(54) COMPENSATOR BLOCK FOR MARINE SEISMIC SOURCE AND METHOD

(71) Applicant: SERCEL, Carquefou (FR)

(72) Inventors: Frédéric Sautron, Hyères (FR); Jacques Samaria, Carquefou (FR); Fabien Barnier, Carquefou (FR)

(73) Assignee: SERCEL, Carquefou (FR)

( * ) Notice: Subject to any disclaimer, the term of this patent is extended or adjusted under 35 U.S.C. 154(b) by 571 days.

(21) Appl. No.: 15/177,429

(22) Filed: Jun. 9, 2016

(65) Prior Publication Data
US 2017/0357016 A1    Dec. 14, 2017

(51) Int. Cl.
*G01V 1/06*      (2006.01)
*G01V 1/137*    (2006.01)

(52) U.S. Cl.
CPC ................................ *G01V 1/137* (2013.01)

(58) Field of Classification Search
USPC ........................................................ 367/144
See application file for complete search history.

(56) References Cited

U.S. PATENT DOCUMENTS

| | | | |
|---|---|---|---|
| 3,379,273 A | 4/1968 | Chelminski | |
| 3,808,822 A | 5/1974 | Chelminski | |
| 4,271,924 A | 6/1981 | Chelminski | |
| 4,713,800 A | 12/1987 | Russell | |
| 4,779,245 A | 10/1988 | Chelminski | |
| 5,018,115 A * | 5/1991 | Pascouet | G01V 1/137 181/120 |
| 5,193,517 A * | 3/1993 | Taylor | F41B 11/64 124/65 |
| 5,420,829 A * | 5/1995 | Pascouet | G01V 1/137 181/115 |
| 5,432,757 A * | 7/1995 | Chelminski | G01V 1/137 181/120 |
| 9,507,038 B2 * | 11/2016 | Richelmi | G01V 1/137 |
| 10,036,822 B2 * | 7/2018 | Sautron | G01V 1/3861 |
| 2010/0320027 A1 * | 12/2010 | Chelminski | G01V 1/116 181/120 |

(Continued)

FOREIGN PATENT DOCUMENTS

| | | | | |
|---|---|---|---|---|
| EP | 2824482 A1 * | 1/2015 | ........... | G01V 1/3861 |
| EP | 2963452 A1 * | 1/2016 | ............. | G01V 1/147 |

OTHER PUBLICATIONS

Written Opinion and International Search Report issued in related International Application No. PCT/IB2017/000948, dated Nov. 7, 2017 (Any reference listed in these reports and not cited herewith have been previously made of record).

*Primary Examiner* — James R Hulka
(74) *Attorney, Agent, or Firm* — Patent Portfolio Builders PLLC (57) ABSTRACT

Method, source and shuttle configured to generate acoustic waves under water. The seismic source includes a housing; a movable shuttle located inside the housing and configured to move between a closed position and an open position along a longitudinal axis X of the housing; a compensator block located inside the housing and configured to move along the longitudinal axis X; a first static seal system configured to seal a first interface between the housing and the movable shuttle in the closed position; and a second static seal system configured to seal a second interface between the movable shuttle and the compensator block in the closed position.

20 Claims, 8 Drawing Sheets

(56) References Cited

U.S. PATENT DOCUMENTS

| | | | |
|---|---|---|---|
| 2014/0238772 A1* | 8/2014 | Chelminski | G01V 1/137 181/119 |
| 2015/0016219 A1* | 1/2015 | Sautron | G01V 1/137 367/23 |
| 2015/0129349 A1* | 5/2015 | Chelminski | G01V 1/137 181/119 |
| 2015/0378037 A1 | 12/2015 | Richelmi et al. | |

* cited by examiner

COMPENSATOR BLOCK FOR MARINE SEISMIC SOURCE AND METHOD

BACKGROUND

Technical Field

Embodiments of the subject matter disclosed herein generally relate to methods and systems and, more particularly, to mechanisms and techniques for sealing one or more chambers in a seismic source with static seals instead of dynamic seals.

Discussion of the Background

Reflection seismology is a method of geophysical exploration to determine the properties of a portion of a subsurface layer in the earth, which information is especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits, which can be identified on images generated based on the above reflections.

For marine applications, sources are essentially impulsive (e.g., compressed air is suddenly allowed to expand). One of the most used sources is the air gun, which produces a high amount of acoustic energy over a short time. Such a source is towed by a vessel either at the water surface or at a certain depth. The acoustic waves from the air gun propagate in all directions. A commonly agreed useful frequency range of the emitted acoustic waves is between 6 and 300 Hz.

Examples of air guns are illustrated in U.S. Patent Application Publication No. US2015/0378037, the entire content of which is incorporated herein by reference. Further examples of air guns are illustrated in FIGS. 1A-2, and these examples illustrate a weakness associated with the seal of these air guns.

Figure 1A:
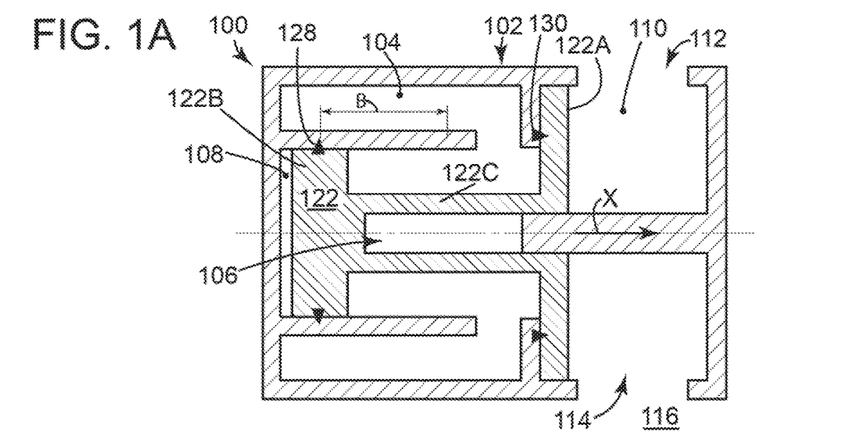
Figure 1B:
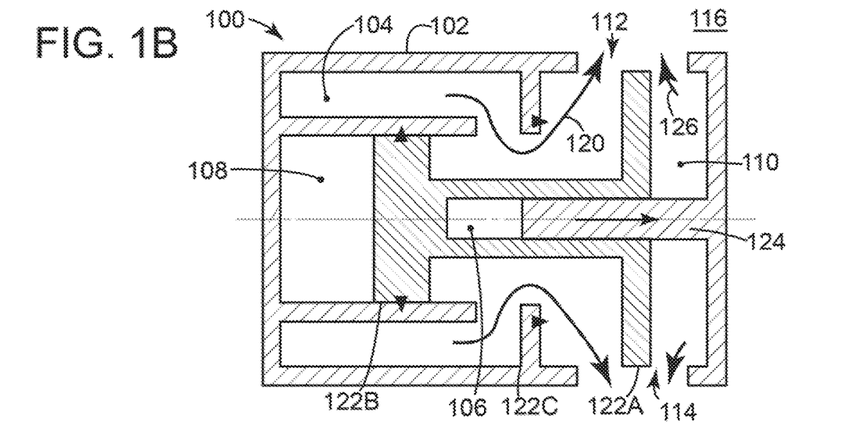
Figure 1C:
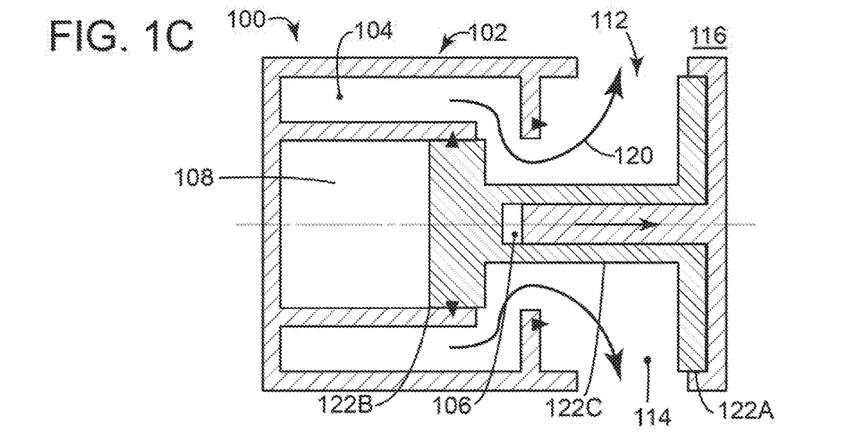
Figure 2:
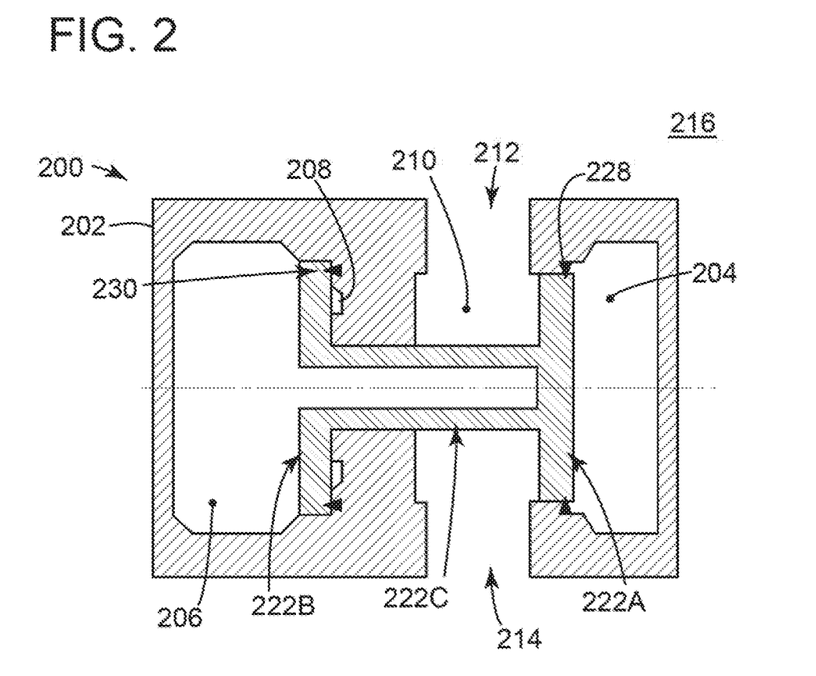

FIG. 1A shows an air gun 100 that has a housing 102 that accommodates four chambers: a firing chamber 104, a return chamber 106, a triggering chamber 108, and a hydraulic chamber 110. Firing chamber 104 stores a gas under pressure, which when expelled through ports 112 and 114 in the ambient 116 (e.g., sea water), generates a bubble. The bubble pulsates under the hydrostatic pressure of the water and these pulsations generate the acoustic waves that are used for seismic exploration.

The pressured gas is maintained in the firing chamber by having a shuttle 122 closing the firing chamber with a front piston 122A, as illustrated in FIG. 1A. Shuttle 122 also has a rear piston 122B that defines the triggering chamber 108. A neck element 122C is interposed between front piston 122A and rear piston 122B and the neck element holds a distance between the two pistons. The pressure applied on the front piston 122A by the compressed gas and the pressure applied by the gas on the rear piston 122B in the triggering chamber 108 are balanced by the pressure applied by a gas in the return chamber 106 and by the hydrostatic pressure of the water in the hydraulic chamber 110. When this balance is perturbed, for example, by increasing the gas pressure in triggering chamber 108, movable shuttle 122 starts moving to the right, as illustrated in FIG. 1B. Under these circumstances, the compressed gas inside firing chamber 104 escapes, as illustrated by arrows 120, toward ports 112 and 114 and then into the ambient to generate the bubble. At the same time, the water volume in the hydraulic chamber 110 (ambient water that enters through ports 112 and 114) is also pushed out of the housing 102, as illustrated by arrows 126 in FIG. 1B. FIG. 1B shows movable shuttle 122 in an intermediate position, in which front piston 122A faces exhaust ports 112 and 114.

Note that air gun 100 has front piston 122A closing firing chamber 104 in FIG. 1A and reducing a volume of hydraulic chamber 110 at a minimum in FIG. 10, in the fully opened position. The phase during which the shuttle 122 moves between the closed and open positions is commonly called "opening phase" or "firing phase" of the airgun. During this phase, shuttle 122 may acquire a high acceleration before uncovering exhaust ports 112 and 114 and the water volume in the hydraulic chamber may act as a brake on the shuttle, as disclosed in US 2015/016219. In the embodiment shown in FIGS. 1A-1C, a solenoid valve (not shown) is used to actuate shuttle 122 by changing its surrounding pneumatic forces and changing its static loads equilibrium.

For maintaining the pressure balance discussed above, at least two seals 128 and 130 are used. FIG. 1A shows seal 128 (radial seal) preventing the compressed air from firing chamber 104 to escape into triggering chamber 108 and vice versa and axial seal 130 preventing the compressed air from firing chamber 104 escaping to the ports and also preventing the water from hydraulic chamber 110 entering the firing chamber before shooting the source.

Continuing to FIG. 1C, most of the compressed gas from the firing chamber 104 has been released into the ambient and the water from the hydraulic chamber 110 has been expelled. At this time, shuttle 122 may have moved to the right, so that front piston 122A may be in contact with a frontal wall of the hydraulic chamber, as illustrated in FIG. 1C. However, in one application, front piston 122A does not contact the frontal wall of the hydraulic chamber. This position is known as the opened position. To bring the shuttle 122 back to the position illustrated in FIG. 1A, which is known as the closed position, compressed air is pumped into the return chamber 106. After this, the cycle of firing the air gun is repeated with a frequency dictated by the seismic survey.

FIG. 2 shows another air gun 200 that has a different configuration than the air gun shown in FIGS. 1A-C. Air gun 200 has a rear piston 222B located within a pneumatic return chamber 206 (also called "operating chamber") in such a way that rear piston 222B cannot exit pneumatic return chamber while front piston 222A moves outside firing chamber 204. Note that in this embodiment hydraulic chamber 210 is located between (i) firing chamber 204 and (ii) pneumatic return chamber 206 and triggering chamber 208, which is formed around shuttle's neck 222C. Ports 212 and 214 are directly communicating with the hydraulic chamber. This embodiment also has two seals, radial seal 228 located on the rim of the front piston 222A and axial seal 230 located on the housing 202.

In any configuration of FIGS. 1A-1C and 2, the air gun has a weak (radial) seal 128, 228 which is prone to failure as now discussed. Most marine sources are pneumatic devices with at least one moving part called shuttle. The shuttle moves between a closed position (air pressure filling) and an opened position (air pressure exhausting) during a seismic survey. There are two or three distinct functional sealing regions that are responsible for most of the inner pneumatic chambers sealing of the traditional acoustic sources, as discussed above.

Seal technologies around the shuttles 122 or 222 improve the operation of the air guns and, if the seals are poor or leak air, they can seriously affect the seismic source's performance. The sealing systems used inside an air gun can be static (not subject to relative movement and dynamic friction) or dynamic (subject to relative movement and dynamic friction). The concept of dynamic friction is known in the art and means friction that appears when two bodies move relative to each other while in contact with each other.

An example of a static sealing arrangement is illustrated in FIG. 1A and it includes the axial sealing ring 130, between a surface of the front shuttle 122A and a surface of the housing 102. An axial sealing arrangement is achieved when an initial contact load of the sealing ring is generated axially between two surfaces having relative movements to each other. When the contact between the two surfaces is suppressed (as one surface moves away from the other surface as in FIG. 1A, for seal ring 130), there is no more friction between those two surfaces as the relative movements between the parts generates a gap (see, for example, FIG. 1B, there is a gap between seal ring 130 and a face of the front piston 122A).

An example of a dynamic sealing arrangement is also illustrated in FIG. 1A, and it includes the radial sealing ring 128, between two cylindrical surfaces (outer surface of rear piston 122B and inside surface of housing 102). A radial sealing arrangement is achieved when an initial contact load of the sealing ring is generated radially between two surfaces having relative movements along an axial direction, which is substantially perpendicular on the radial direction. In the most common way of use, when dynamic seals are used for air gun shuttle tightness, there is a reciprocating movement stroke (for example, stroke B in FIG. 1A) between rear piston 122B and housing 102 and the sealing system is mounted in a female or male gland for radial tightness.

When static seals are used for air gun shuttle tightness, the sealing system is generally mounted in an axial surface faced configuration, which is called seat seal with a closing/opening air flow passage. This sealing system is exposed to contact discontinuities and impacts. As for radial tightness, a minimum contact pressure load is necessary between the sealing parts to create the sealing. When axial sealing systems are used, this minimal pressure contact can be obtained by: sealing elements deformation (as for radial sealing), spring compression, or pressure compression. As soon as a minimum compression for sealing is obtained and the pressure differential between the chambers is changing, the pneumatic loads have to be considered for increasing the contact pressure while the pressure differential is increasing.

In a traditional air gun, at least one static seal 130, 230 and one dynamic seal 128, 228 are necessary to pressurize the firing chamber and to trigger the shuttle. As discussed above, a dynamic seal includes one part that moves relative to another part, and also one of the parts is in continuous frictional motion with the seal. This frictional motion makes the seal subject to fatigue and failure in time. Because an air gun may shoot once every 10 seconds (with thereby one complete course and a set of oscillations every 10 seconds), the fatigue experienced by a dynamic seal in such seismic source is significant and failure of the seal likely. Although the cost of the seal is relatively low, the cost of stopping the seismic survey for replacing the seal in the seismic source is very high, which makes the failure of the seal to be of great concern for the seismic survey's operator.

Thus, based at least on the above limitations of the existing sources, there is a need to develop new sources that will eliminate or minimize the impact of a failed seal on their performance, thus be more reliable, and have an extended lifetime. Accordingly, it would be desirable to provide systems and methods that overcome the afore-described problems and drawbacks.

SUMMARY

According to one embodiment, there is a seismic source configured to generate acoustic waves. The seismic source includes a housing, a movable shuttle located inside the housing and configured to move between a closed position and an open position along a longitudinal axis X of the housing, a compensator block located inside the housing and configured to move along the longitudinal axis X; a first static seal system configured to seal a first interface between the housing and the movable shuttle in the closed position; and a second static seal system configured to seal a second interface between the movable shuttle and the compensator block in the closed position.

According to another embodiment, there is a seismic source configured to generate acoustic waves. The seismic source includes a housing having a firing chamber, a triggering chamber, and a hydraulic chamber, the hydraulic chamber having at least one opening port communicating with an ambient; a movable shuttle having a first piston separated from a second piston by a neck, wherein the first piston separates the firing chamber from the hydraulic chamber when the movable shuttle is in a closed position, and the second piston separates the firing chamber from the triggering chamber when the movable shuttle is in the closed position; a compensator block located inside the housing and separating the triggering chamber from a purge chamber, wherein the compensator block is configured to move along a longitudinal axis X of the housing; a first static seal system configured to seal a first interface between the housing and the first piston in the closed position; and a second static seal system configured to seal a second interface between the second piston and the compensator block in the closed position. The compensator block moves less along the longitudinal axis than the movable shuttle.

According to still another embodiment, there is a method of generating seismic waves with a seismic source. The method includes pressurizing a firing chamber inside a housing of the seismic source; pressurizing an energizing chamber inside the housing so that a movable shuttle located inside the housing is in a closed position; balancing plural pressures applied on a compensator block located inside the housing maintain the movable shuttle in the closed position; increasing a triggering pressure inside a triggering chamber to move the compensator block away from the movable shuttle; and generating the seismic waves by releasing a compressed gas from the firing chamber into the ambient of the housing while the movable shuttle moves to an open position. A first static seal system seals a first interface between the housing and the movable shuttle when the movable shuttle is in the closed position. A second static seal system seals a second interface between the movable shuttle and the compensator block when the movable shuttle is in the closed position.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 1A-2 are schematic diagrams of seismic sources in various positions;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an air gun. However, the embodiments to be discussed next are not limited to the air gun, but may be applied to other structures that use seals for generating a wave having a controlled frequency range.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a movable shuttle for a seismic source configured to generate acoustic waves. The seals between the movable shuttle and a housing of the seismic source are axial seals. In other words, the two or more seals between the shuttle and the housing are not radial seals. In this way, there is no frictional movement for the seals located between the shuttle and the housing, there is no need of lubricant for these seals, there is less wear of the seals, and there is no early failure of the seismic source due to the traditional radial seals.

One or more of the advantages noted above is achieved with an air gun that has two axial seals, one for each of the front and rear pistons. In other words, the radial (or dynamic) seal 128 or 228 in the previous embodiments is substituted with an axial (or static) seal as now discussed with regard to FIGS. 3A-3C.

Figure 3A:
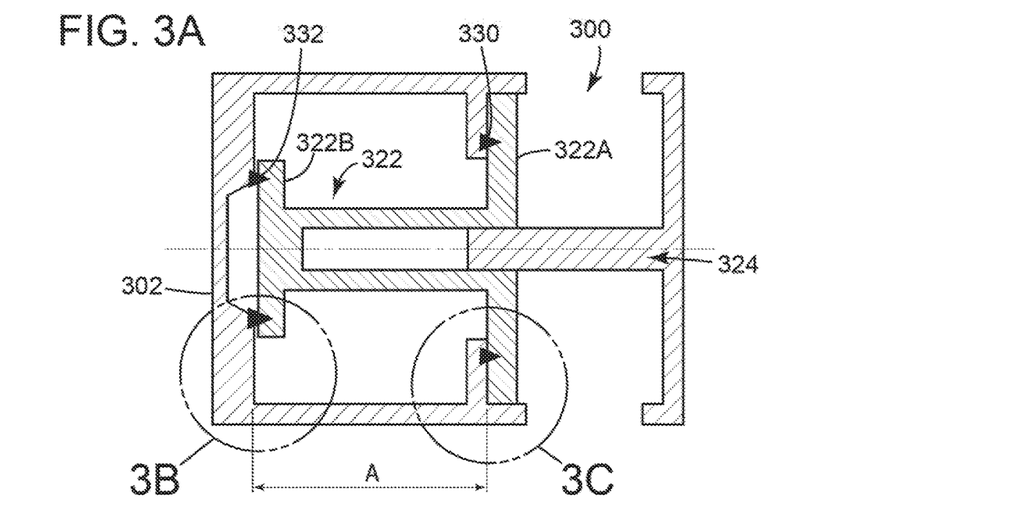
FIGS. 3A-3C illustrate a problem when a prior art seismic source uses two static seal systems instead of one static and one dynamic seal systems.
Figure 3B:
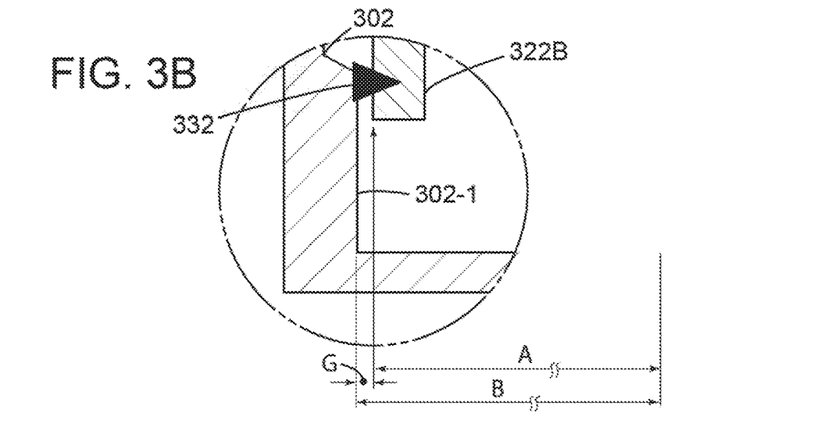
Figure 3C:
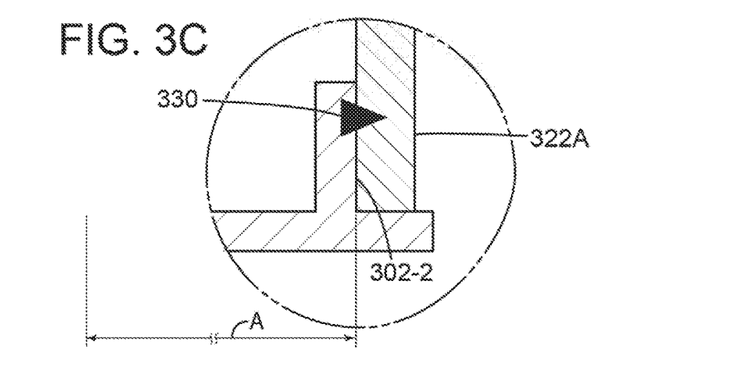

FIG. 3A shows an air gun 300 having a shuttle 322 moving inside housing 302. Two static seals 330 and 332 are placed between internal surfaces of the housing 302 and front and rear pistons 322A and 322B. Details of seal 332 are shown in FIG. 3B and those of seal 330 are shown in FIG. 3C. Because a distance A between back surfaces of front and rear pistons 322A and 322B does not exactly coincide with the axial stroke B characterizing housing 302 (e.g., distance between housing walls 302-1 and 302-2 facing pistons 322A and 322B), there is a gap G between the back surface of the rear piston 322B and housing wall 302-1, as illustrated in FIG. 3B. In addition, there are manufacturing limitations which make hard to have the two distances A and B equal. Gap G plus distance A equal in this case axial stroke B. Because of this gap, there is a possibility that a gas leak may develop and seal 332 might not achieve its intending sealing function, thus resulting in failure, in particular with aging.

Therefore, the inventors of this patent application have come with the idea of having, in addition to the two static seals, a moving compensator block for compensating the gap G so that distances A and B are made to be substantially identical in spite of mechanical manufacturing limitations discussed above.

Figure 4:
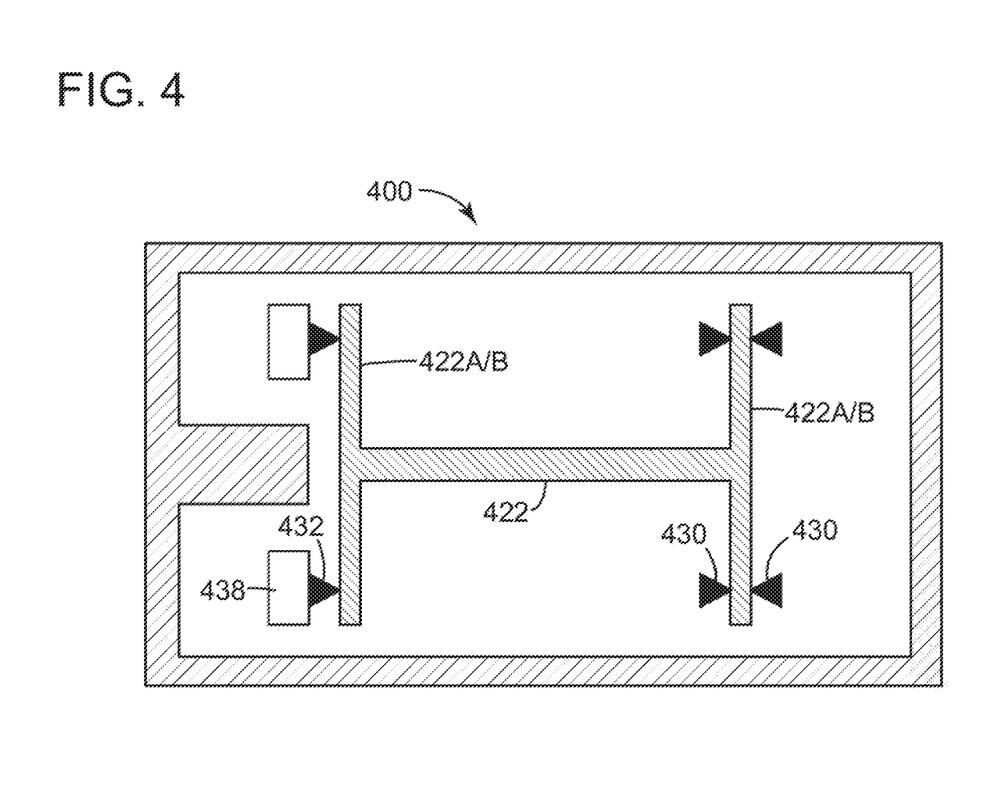
FIG. 4 illustrates a compensator block attached to a static seal system in a seismic source.

Thus, according to an embodiment illustrated in FIG. 4, a novel air gun 400 (or seismic source) includes a compensator block 438 that holds static seal 432 and the compensator block is configured to move the static seal 432 toward the front or rear piston 422A/B. The embodiment of FIG. 4 schematically shows housing 402 without any chamber (e.g., firing chamber, triggering chamber, hydraulic chamber, etc.) for illustrating that each of the front and rear pistons 422A and 422B has a corresponding static seal 432 or 430, and one of the seals is hold by the compensator block 438 (FIG. 4 shows seal 432 being located on compensator block 438) and pressed toward the shuttle 422, when necessary, to seal a chamber. The exact position of each chamber inside the housing can change depending on the implementation.

Various implementations of this generic embodiment are now discussed with regard to FIGS. 5A-7. FIGS. 5A-5G show a seismic source 500 that has a couple of chambers located inside housing 502. Firing chamber 504, return chamber 506 and hydraulic chamber 510 are similar to the chambers of the previous embodiments, and thus, their description and functionality is omitted herein. A triggering chamber 508 is different from the previous embodiments and an energizing chamber 534 and a purge chamber 536 are newly added. Their functionality is discussed after the other elements of the source element (air gun) are described.

A pneumatic compensator block 538 is located inside housing 502, in such a way to separate triggering chamber 508, energizing chamber 534 and purge chamber 536 from firing chamber 504. Triggering chamber 508 is formed around a stop element 540. Stop element 540 may be part of the housing 502. Pneumatic compensator block 538 may be made from a plastic, metallic, or composite material. The pneumatic compensator block 538 is configured to move back and forth along X axis, when an appropriate pressure imbalance is generated on faces 538A and 538B.

Figure 5A:
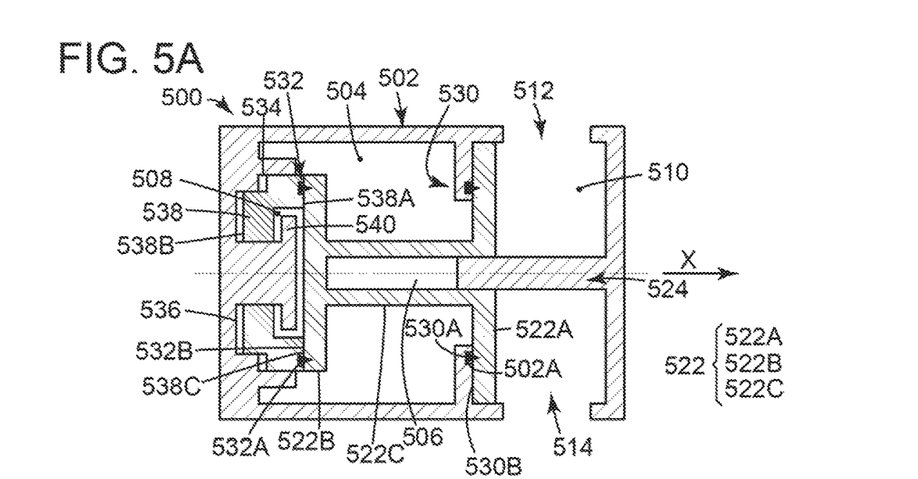
FIGS. 5A-5G illustrate how a seismic source with two static seal systems and a compensator block provide superior sealing.

Movable shuttle 522 has a front piston 522A, a rear piston 522B and a neck 522C that connects the two pistons to each other. Front piston 522A closes firing chamber 504 in FIG. 5A while rear piston 522B closes triggering chamber 508. When pneumatic compensator block 538 is biased against rear piston 522B, as illustrated in FIG. 5A, triggering chamber 508 is also closed by rear piston 522B, and energizing chamber 534 and purge chamber 536 are closed by the pneumatic compensator block 538.

The first static seal system 530 (front seal system) is formed between housing 502 and the front piston 522A, with the actual front seal ring 530A seating in a groove 502A formed in the housing 502. The first static seal system 530 seals an interface 530B between the housing 502 and the front piston 522A. Note that in one embodiment, the actual front seal ring 530A may seat in a corresponding groove formed in the front piston. The second static seal system 532 (rear seal system) is formed between the pneumatic (the qualifier "pneumatic" is added to indicate that the compensator block in this embodiment is pneumatically engaged to move toward the shuttle; however, other means may be used, one of which is discussed later) compensator block 538 and the rear piston 522B, with the actual rear seal ring 532A seating in a groove 538C formed in the pneumatic compensator block. The second static seal system 532 seals an interface 532B between the compensator block 538 and the rear piston 522B. In one embodiment, the actual rear seal ring 532A may seat in a corresponding groove formed in the rear piston. Also note that the actual seal rings may be attached by other means to their backings (i.e., front or rear pistons, housing, pneumatic compensator block, etc.), for example, they may be glued, screwed, bolted or fused to their backings.

Figure 5B:
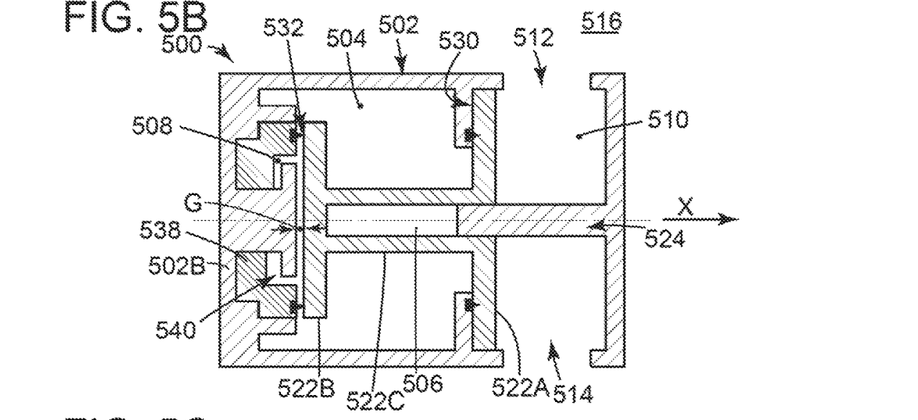
Figure 5C:
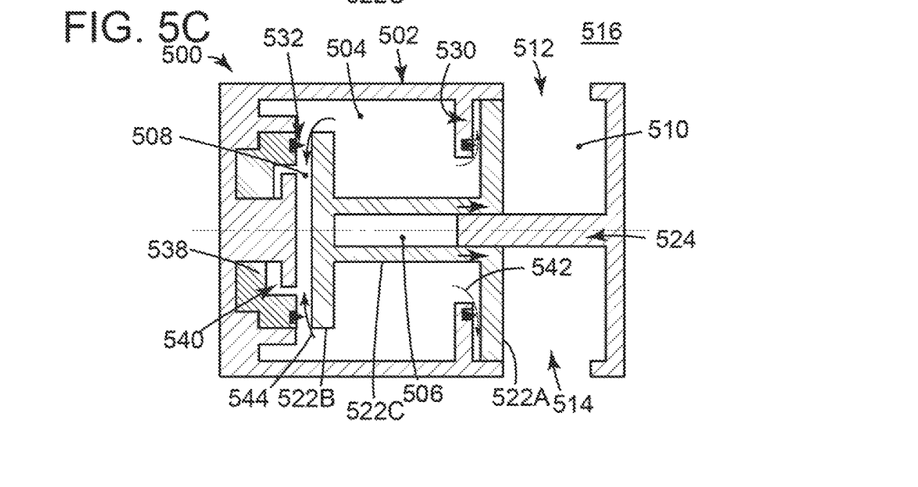

Those skilled in the art would note that both front and rear seal systems 530 and 532 are static seals and not dynamic seals. This means, that after the shuttle 522 moves from the closed position illustrated in FIG. 5A, to an intermediate position as illustrated in FIGS. 5B and 5C, there is no contact between the seal rings and their corresponding surfaces of the seismic source, which makes the seal system to be less prone to fatigue.

However, as has been discussed above with regard to FIGS. 3A-3C, the presence of two static seals (no dynamic seals) would not be able to seal the chambers noted above. This problem has been solved by the present inventors by adding the movable pneumatic compensator block 538, which is biased toward one of the static seal (rear seal system 532 in FIG. 5A) to achieve the desired sealing function. In this way, even if the front piston 522A is pressing against the front seal ring 530A and the rear piston 522B is a distance G apart from the rear seal ring 532A, by moving the pneumatic compensator block 538 towards rear piston 522B, the distance G is reduced to zero, so that a good contact is achieved between the rear piston and the rear seal ring 532A, in addition to the already good contact between the front piston and the front seal ring 530A. Note that the pneumatic compensator block may be placed to the other end of the movable shuttle so that the pneumatic compensator block biases the front seal ring and not the rear seal ring. The novel feature that this embodiment adds is the movable pneumatic compensator block, which biases one of the front or rear seal ring to achieve a good sealing. This means that the location of the pneumatic compensator block can be at either end of the housing.

Stop element 540 is shown in FIG. 5A next to the rear piston. However, if the pneumatic compensator block 538 is positioned next to the front piston, stop element would be placed in the same area. The stop element limits a movement of the pneumatic compensator block along axis X, which allows to reduce its energy with small amounts of pressurized gas to be used, to limit any fatigue of the compensator block 538, and to open not too late. Thus, for the embodiment illustrated in FIGS. 5A-5G, pneumatic compensator block 538 can move between the back wall 502B of the housing 502 and the stop element 540 (see FIG. 5B). The position of the stop element is not random, but rather it is calculated to allow the pneumatic compensator block to move at least the distance G, which is the gap between the distances B and A introduced when discussing the configuration shown in FIGS. 3A-3C. In other words, the distance G is calculated as a difference between (1) the distance B between the back of the front piston and the housing and (2) the distance A between the back of the front piston and the back of the rear piston. In one embodiment, the distance G is calculated to be equal to or larger than B-A.

Figure 6:
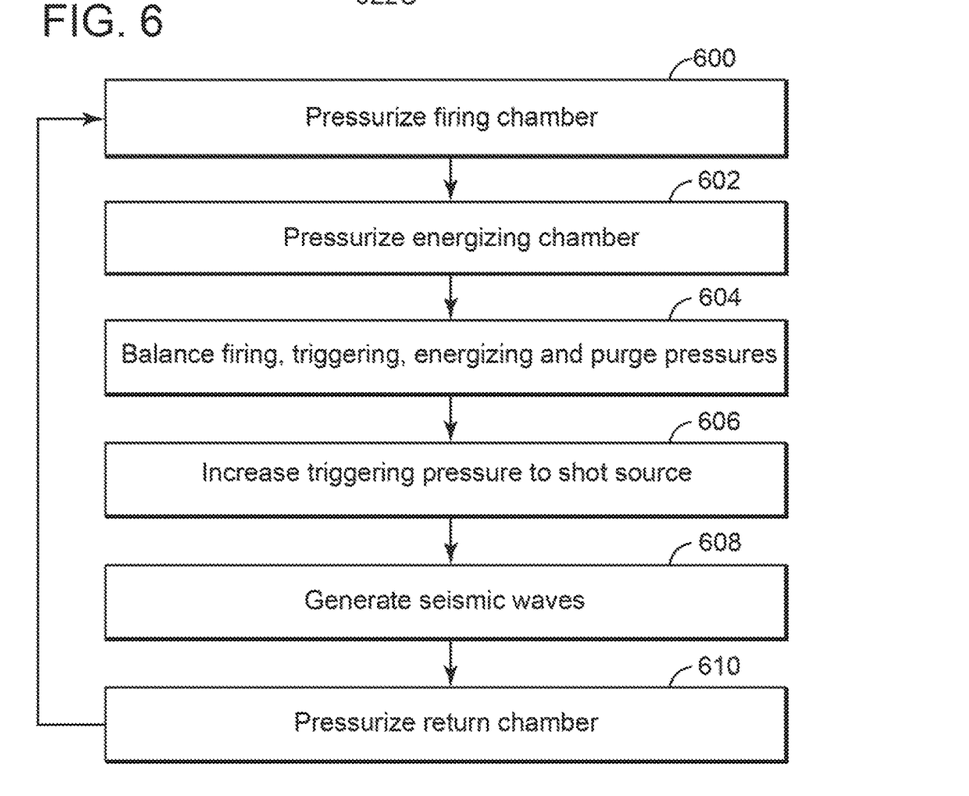
FIG. 6 is a flowchart of a method for using the source element illustrated in FIGS. 5A-5G.

The operation of the source 500 is now discussed with regard to FIG. 6. In step 600, the firing chamber 504 is pressurized at a given pressure and the front and rear seal systems are fully engaged, so that the pressurized gas from the firing chamber does not escape into the hydraulic chamber 510. Simultaneously, or earlier or later, the energizing chamber 534 is pressurized in step 602. Note that the order of these two steps can be reversed or it can be simultaneous. Pressurizing the energizing chamber 534, makes the pneumatic compensator block 538 to move toward the rear piston 522B, and thus, to engage the rear sealing system 532. The pressure in the energizing chamber can be increased until equal to the pressure in the firing chamber 504.

Figure 5D:
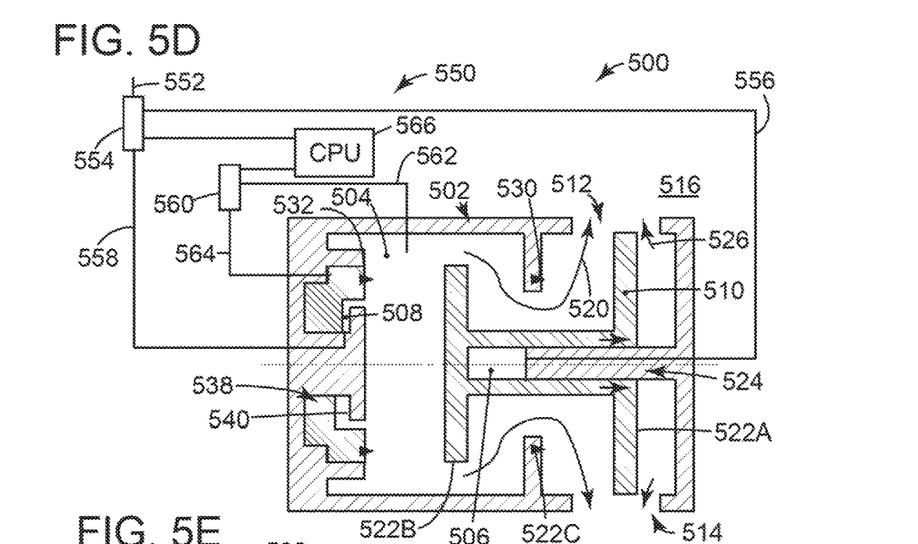

In step 604, the pressures in the firing chamber, triggering chamber, energizing chamber and purge chamber are balanced with a pressure mechanism 550, which is illustrated in FIG. 5D. FIG. 5D is chosen to illustrate the pressure mechanism as the previous figures are too loaded with reference numbers and would make the understanding more difficult.

FIG. 5D illustrates pressure mechanism 550 having a main pressure supply pipe 552 that provides compressed gas (e.g., air) from the vessel. It is known that an air gun receives through its umbilical compressed air from a compressor located on the vessel. Main pressure supply pipe 552 may be the umbilical or part of the umbilical. Main pressure supply pipe 552 enters a valve 554 that distributes the compressed gas to the return chamber 506, along return pipe 556, and to triggering chamber 508, along triggering pipe 558. Valve 554 also supplies the compressed gas to a secondary valve 560, which in turn supplies compressed gas to firing chamber 504, along firing pipe 562 and to the energizing chamber 534, along an energizing pipe 564. While the secondary valve may supply the compressed gas at the same pressure as in the firing chamber and the energizing chamber, the main valve 554 may be configured and/or controlled by a processor 566 to supply different pressures to the triggering chamber, secondary valve 560 and the return chamber 506. Further, the main and/or secondary valves may be configured or controlled to gradually increase the supplied pressure as necessary. In one embodiment, a single valve performs the functions of the primary and secondary valves. Valves for achieving these results are known in the art, for example, an electro-hydraulic valve controlled by a solenoid, a servo-valve, etc. The valves may have two-, three- or multi-ports. The valves may be actuated electrically, pneumatically, etc.

Figure 5E:
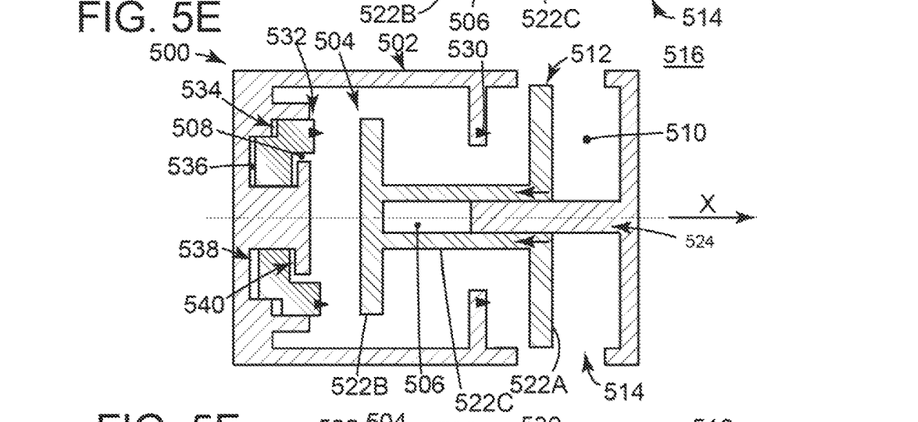
Figure 5F:
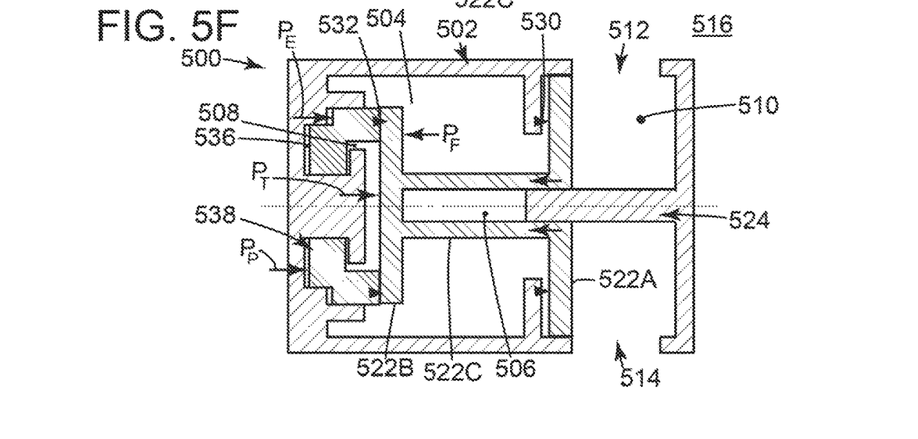

Returning to the method of FIG. 6, after the firing pressure $P_f$, the triggering pressure $P_t$, energizing pressure $P_e$ and purge pressure $P_p$ have been balanced, shuttle 522 is in the closed position as illustrated in FIG. 5A and the system is ready to shoot. This is so because the above noted pressures, which are illustrated in FIG. 5F (note that these pressures are not balanced in FIG. 5F, but this figure has been chosen to illustrate these pressures because it is less loaded with other reference sings and elements), all act on the movable pneumatic compensator block 538 and the rear piston 522B, and when these two elements are at rest, these pressures cancel each other. Note that the pressure in the purge chamber is not controlled, it is substantially the hydrostatic pressure at that depth of the source.

To fire the source, the triggering pressure $P_t$ is increased in step 606 by allowing more compressed gas from main valve 554 along triggering pipe 558. This step may be controlled by processor 566. The triggering pressure $P_t$ is increased until passing a triggering pressure level, which is an ultimate level at which the pressures illustrated in FIG. 5F still maintain the movable shuttle and the pneumatic compensator block in a fix position. When the triggering pressure becomes larger than the triggering pressure level, the forces applied on the pneumatic compensator block are not cancelling each other any more, and the compensator block starts to move toward the back wall of the housing, i.e., along the negative direction of the X axis, as illustrated in FIG. 5B. This means that the forces applied on the shuttle are still at equilibrium but the tightness of the rear seal system 532 is decreasing and the high pressure gas in the firing chamber 504 starts to leak into the triggering chamber as illustrated by arrow 544 in FIG. 5C.

At this time, the triggering chamber 508's pressure is increasing drastically, the equilibrium of the shuttle 522 is broken, and the shuttle starts to move forward as illustrated in FIG. 5C. At the same moment, the tightness function of the front seal system 530 is cancelled and the high pressure gas in the firing chamber 504 starts to leak in the hydraulic chamber 510, as illustrated by arrows 542 in FIG. 5C. The shuttle is accelerating and further opening, as illustrated in FIG. 5D, which shows the movable shuttle 522 in an intermediate position in which firing piston 522A faces exhaust ports 512 and 514. The figures show only two ports, but the source element may have more ports. The high pressure gas in return chamber 506 is released in the ambient through a port or valve (e.g., valve 554) so that the shuttle can freely move to the open position illustrated in FIG. 5D.

Figure 5G:
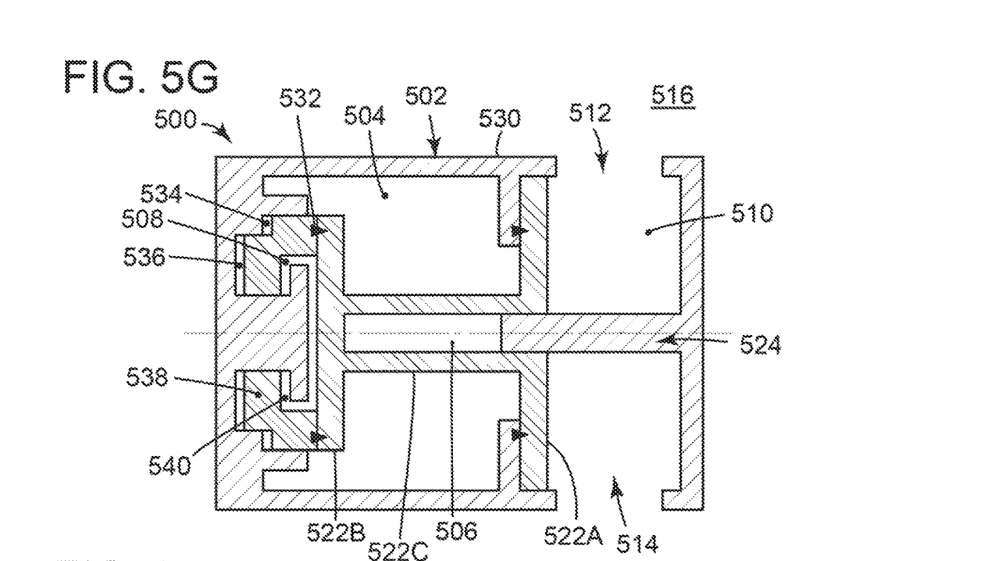

When the compressed gas from the firing chamber is released in step 608 through ports 512 and 514 outside the housing 502, seismic waves are generated. After this, the shuttle has to be moved to the closed position and the firing chamber recharged to prepare the source for shooting again. Thus, in step 610, the return chamber 506 is pressurized thought return pipe 556, with compressed gas received from main valve 554. As illustrated in FIG. 5E, shuttle 522 starts moving back to the closed position. Simultaneously (or after some time), energizing chamber 536 is supplied with compressed gas from energizing pipe 564, to bias the pneumatic compensator block 538 toward the rear piston 522B. Stop element 540 limits the movement of the pneumatic compensator block as illustrated in FIG. 5F. FIG. 5F also shows the rear piston touching the rear seal ring and starting to seal the triggering chamber from the firing chamber. At the same time, the firing chamber is sealed from the hydraulic chamber by the front seal ring. FIG. 5G shows the shuttle pushing back the pneumatic compensator block as the gas pressure inside the return chamber 506 is further increased. As both seal systems 530 and 532 have achieved their seal functionality, the firing chamber 504 is pressurized again in step 600 with compressed gas from valve 560, until a desired pressure is achieved. At this moment, the source is ready to fire again. The steps of FIG. 6 may be repeated during a seismic survey every 10 s. This number can be changed, either to increase or decrease.

The pressure mechanism 550, which was illustrated in FIG. 5D to include two valves and various pipes is exemplary and one skilled in the art would know how to modify, adapt, improve or adjust it to better suit a given air gun's needs. For example, it is possible that energizing pipe 564 and firing pipe 562 freely communicate with each other so that the same pressure is achieved inside the energizing chamber and the firing chamber, at the same time.

Figure 7:
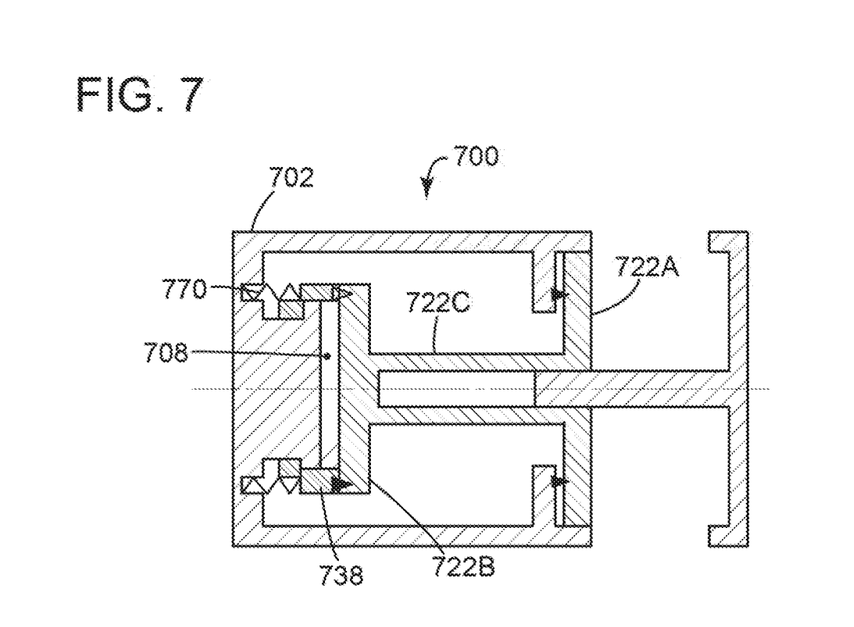
FIG. 7 illustrates another embodiment that uses two static seal systems with a compensator block energized by a spring mechanism.

Another modification to the embodiment illustrated in FIGS. 5A-5G is illustrated in FIG. 7, where the compensator block 738 is biased with a spring system 770 instead of compressed gas. For this embodiment, energizing chamber is not necessary as spring system 770 biases the compensator block toward the rear piston 722B. Spring system 770 may include any known spring, leaf or deformable material which will provide enough force to move the compensator block 738.

Figure 8:
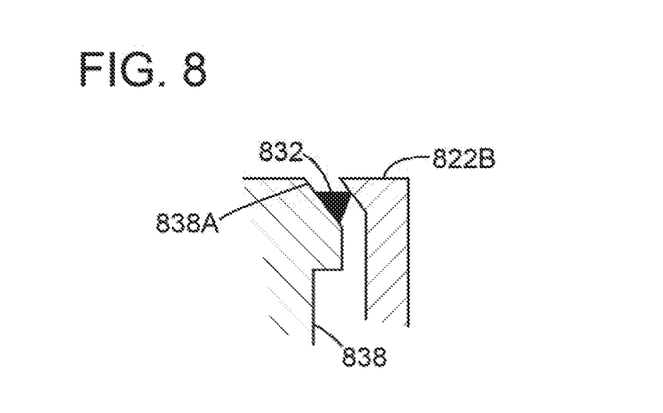
FIG. 8 illustrates a modification of the compensator block.

In another embodiment illustrated in FIG. 8, the seal ring 530 or 532 may be adapted to be supported by a conical surface. For example, compensator block 838 may be configured to have part of its frontal surface 838A shaped as a conical surface, with the rear seal ring 832 being attached to the conical surface. Rear piston 822B (or any other piston or element that contacts the seal ring) may also be shaped to have a conical surface to contact the seal ring.

While the above embodiments have focused on the two main seals between the firing chamber and the triggering chamber and the firing chamber and the hydraulic chamber, those skilled in the art would understand that other seals may be present, for example, between the firing chamber and the energizing chamber, between triggering chamber and purge chamber, or energizing chamber and purge chamber. These seals may be dynamic seals.

The disclosed embodiments provide a source and a method for generating acoustic waves. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic source configured to generate acoustic waves, the seismic source comprising:
   a housing;
   a movable shuttle located inside the housing and configured to move between a closed position and an open position along a longitudinal axis X of the housing;
   a compensator block located in gas inside the housing and configured to move along the longitudinal axis X;
   a first static seal system configured to seal a first interface between the housing and the movable shuttle in the closed position; and
   a second static seal system configured to seal a second interface between the movable shuttle and the compensator block in the closed position.

2. The seismic source of claim 1, further comprising:
   a stop element located inside the housing and configured to block a movement of the compensator block along the longitudinal axis in the open position.

3. The seismic source of claim 2, wherein the compensator block moves between the stop element and the housing along the longitudinal axis.

4. The seismic source of claim 1, wherein each of the first and second static seal systems includes a respective first and second seal ring that is free of dynamic friction.

5. The seismic source of claim 1, wherein the first static seal system seals a firing chamber from a hydraulic chamber, the firing chamber storing compressed gas and the hydraulic chamber being filled with ambient sea water, and a release of the compressed gas from the firing chamber outside the housing generates the seismic waves.

6. The seismic source of claim 1, wherein the second static seal system seals a firing chamber from a triggering chamber, the firing chamber storing a first compressed gas and the triggering chamber storing a second compressed gas, the release of the first compressed gas from the firing chamber outside the housing generates the seismic waves and an increase in pressure of the second compressed gas moves the compensator block away from the shuttle.

7. The seismic source of claim 1, wherein an energizing chamber is formed between the compensator block and a wall of the housing, and when the energizing chamber is energized with a compressed gas, the compensator block is biased toward the shuttle.

8. The seismic source of claim 1, wherein the shuttle houses a return chamber that when energized, returns the shuttle from the open position to the closed position.

9. The seismic source of claim 1, wherein the compensator block and the shuttle have matting conical surfaces that accommodate the second seal system.

10. A seismic source configured to generate acoustic waves, the seismic source comprising:
a housing having a firing chamber filled with gas, a triggering chamber, and a hydraulic chamber filled with liquid, the hydraulic chamber having at least one opening port communicating with an ambient;
a movable shuttle having a first piston separated from a second piston by a neck, wherein the first piston separates the firing chamber from the hydraulic chamber when the movable shuttle is in a closed position, and the second piston separates the firing chamber from the triggering chamber when the movable shuttle is in the closed position;
a compensator block located in the gas inside the housing and separating the triggering chamber from a purge chamber, wherein the compensator block is configured to move along a longitudinal axis X of the housing;
a first static seal system configured to seal a first interface between the housing and the first piston in the closed position; and
a second static seal system configured to seal a second interface between the second piston and the compensator block in the closed position,
wherein the compensator block moves less along the longitudinal axis than the movable shuttle.

11. The seismic source of claim 10, wherein the housing further includes an energizing chamber formed by a back wall of the housing and the compensator block.

12. The seismic source of claim 11, wherein the compensator block is biased against the second piston by a pressure inside the energizing chamber.

13. The seismic source of claim 10, wherein an increase in pressure in the triggering chamber moves the compensator block along the longitudinal axis in one direction and makes the shuttle to move along the longitudinal axis in an opposite direction.

14. The seismic source of claim 10, further comprising:
a return chamber formed inside the neck of the shuttle and configured to return the shuttle from an open position, in which the compressed gas from the firing chamber escapes into the ambient, to the closed position.

15. The seismic source of claim 10, further comprising:
a pressure mechanism configured to supply compressed gas to the chambers.

16. A method of generating seismic waves with a seismic source, the method comprising:
pressurizing a firing chamber inside a housing of the seismic source;
pressurizing an energizing chamber inside the housing so that a movable shuttle located inside the housing is in a closed position;
balancing plural pressures applied on a compensator block located inside the housing maintain the movable shuttle in the closed position;
increasing a triggering pressure inside a triggering chamber to move the compensator block away from the movable shuttle; and
generating the seismic waves by releasing a compressed gas from the firing chamber into the ambient of the housing while the movable shuttle moves to an open position,
wherein a first static seal system seals a first interface between the housing and the movable shuttle when the movable shuttle is in the closed position, and
wherein a second static seal system seals a second interface between the movable shuttle and the compensator block when the movable shuttle is in the closed position.

17. The method of claim 16, wherein the plural pressures include a firing pressure formed inside the firing chamber, the triggering pressure formed inside the triggering chamber, an energizing pressure formed in an energizing chamber, and a purge pressure formed in a purge chamber.

18. The method of claim 16, further comprising:
filling an energizing chamber, which is formed between the compensator block and a wall of the housing, with the compressed gas so that the compensator block is biased toward the shuttle.

19. The method of claim 16, wherein the shuttle houses a return chamber that when energized, returns the shuttle from the open position to the closed position.

20. The method of claim 16, wherein each of the first and second static seal systems includes a respective seal ring that is free of dynamic friction when the movable shuttle moves between the closed position and the open position.

* * * * *